C. Reif,
Clover Huller.
No. 11,493.
Patented Aug. 8, 1854.
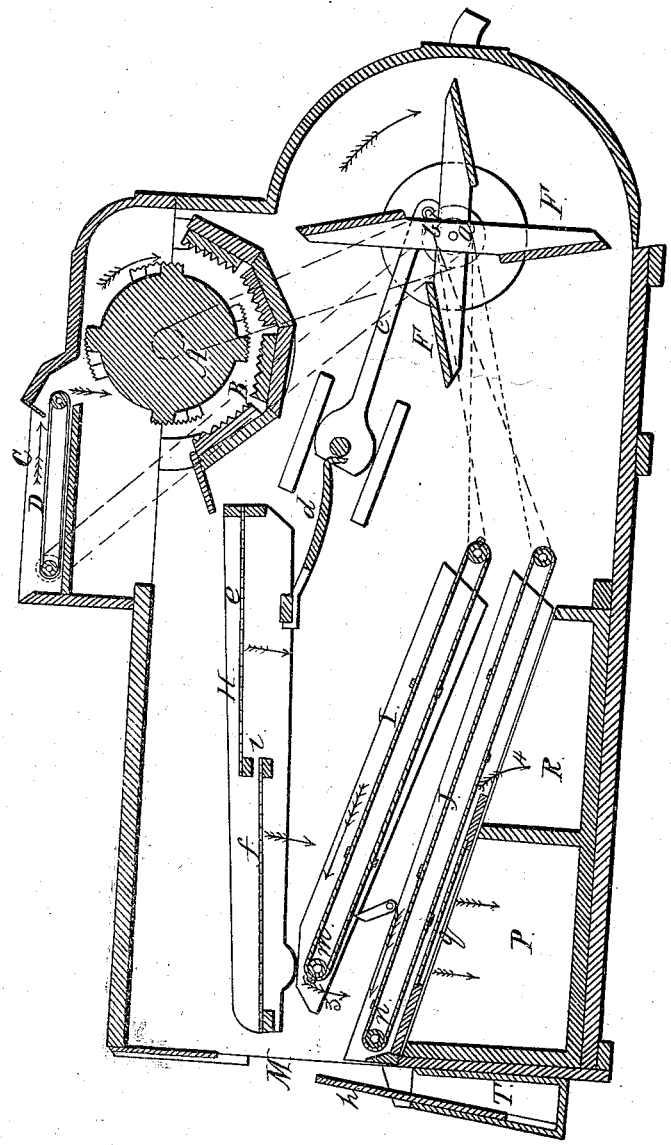

UNITED STATES PATENT OFFICE.

CHRISTIAN REIF, OF HARTLETON, PENNSYLVANIA.

CLOVER-SEPARATOR.

Specification forming part of Letters Patent No. 11,493, dated August 8, 1854; Reissued February 5, 1861, No. 1,135.

*To all whom it may concern:*

Be it known that I, CHRISTIAN REIF, of Hartleton, in the county of Union and State of Pennsylvania, have invented a new and useful Improvement in Clover-Separators; and I do hereby declare that the following is a full, clear, and exact description of the construction and operation of the same, reference being had to the annexed drawing, forming part of this specification, which represents a vertical longitudinal section of the machine.

My invention which refers to the arrangement for cleaning the seed after it has passed from the hulling portion of the machine, consists in so combining sieves and carriers that the seed shall be subjected to the action of the fan blast in small quantities at a time, sufficiently often, to remove all hulls and other light impurities, and also to be separated from heavy impurities of nearly the same specific gravity, as will be hereafter set forth.

To enable others skilled in the art to make and use my invention I will proceed to describe its construction and operation.

In the drawing A is the hulling cylinder, B the concave, C the hopper, D a carrier for conveying the seed to the mill, F a fan, and H the upper sieve, reciprocated by the rotation of the fan shaft $a$, through crank $b$ and rods $c$ and $d$. This sieve is formed of two parts, the upper and nearest the mill sufficiently above the lower $f$ to admit of the blast passing through the opening $i$ and sweeping the surface of the lower portion of the sieve. Below the sieve H is the carrier I moved as shown by the arrows, which carrier receives the seed as it drops from the sieve H and conveys it over the shaft $m$ as shown by arrow 3. After leaving the carrier I, the seed is received upon the lower carrier J and being conveyed over the shaft $n$ is drawn upon the lower sieve $q$, through which the cleaned and perfect seed pass to the receptacle P, while impurities larger than the seed, but of nearly the same specific gravity pass over the sieve and drop into the receptacle R as shown by arrow 4.

During the entire passage of the seed through the cleaning machinery it is acted upon by the fan blast and at many points in a very divided state, the division of the upper screen giving it a free sweep over the surface of the lower portion, while as the seed falls to the carrier I the blast passes through it; and again in its fall between the two carriers, the sheet passing over the shaft $m$ is so thin that the remaining hulls and light impurities cannot fail to be driven off through the mouth M, the board $p$ serving to arrest the light grains of seed and cause them to drop into the receptacle T: the tailings from the upper sieve will also drop into the same box.

I do not claim any of the parts of my machine separately considered, but

What I do claim as my invention, is—

The herein described arrangement of sieves H and $q$ and carriers I and J for cleaning clover seed substantially as herein fully set forth.

In testimony whereof, I have hereunto signed my name before two subscribing witnesses.

CHRISTIAN REIF.

Witnesses:
 GEO. PATTEN,
 SAML. GRUBB.

[FIRST PRINTED 1913.]